United States Patent [19]

Ver Mehren

[11] 4,257,514

[45] Mar. 24, 1981

[54] CONVEYOR APPARATUS WITH ALIGNMENT MEANS

[75] Inventor: Hubert R. Ver Mehren, Florissant, Mo.

[73] Assignee: Ga-Vehren Engineering Company, St. Louis, Mo.

[21] Appl. No.: 920,537

[22] Filed: Jun. 29, 1978

[51] Int. Cl.[3] .......................... B65G 47/26; B65G 47/31

[52] U.S. Cl. .......................................... 198/459; 198/461

[58] Field of Search ................ 198/459, 461, 836, 624

[56] References Cited

U.S. PATENT DOCUMENTS

| | | | |
|---|---|---|---|
| 3,015,919 | 1/1962 | MacDonald | 198/461 |
| 3,348,655 | 10/1967 | Pierce, Jr. et al. | 198/461 |
| 3,719,266 | 3/1973 | Korn et al. | 198/624 |
| 4,063,579 | 12/1977 | Stake | 198/836 |

FOREIGN PATENT DOCUMENTS

| | | | |
|---|---|---|---|
| 1224666 | 9/1966 | Fed. Rep. of Germany | 198/461 |

*Primary Examiner*—Joseph E. Valenza
*Assistant Examiner*—Brian Bond
*Attorney, Agent, or Firm*—Cohn, Powell & Hind

[57] ABSTRACT

This conveyor apparatus is intended for use primarily with continuous web business form processing machines, and provides a means of accurately aligning conveyed, flat articles from a feed station for further processing. The apparatus includes a pair of endless conveyor belts flanked by endless chains, the chains having perpendicularly aligned pairs of outwardly extending aligner elements which are engageable by the conveyed articles. The linear speed of the belts is greater than that of the aligner elements so that articles are urged forwardly into engagement with aligner elements.

7 Claims, 5 Drawing Figures

CONVEYOR APPARATUS WITH ALIGNMENT MEANS

BACKGROUND OF THE INVENTION

This invention relates generally to an apparatus for aligning articles on a conveyor belt and particularly to the alignment of flat, lightweight inserts used in continuous web business processing machines.

Machines of the type used to process continuous web business forms frequently require that insert material in the form of letters or envelopes be deposited at specific intervals on the rapidly moving web. The inserts are usually supplied from a feed station disposed above the web and it is necessary to maintain a high degree of accurate coordination between the movement of the web and the movement of the inserts. It is also necessary to maintain accurate alignment of the inserts so that they are correctly deposited on the web, and the failure to maintain such alignment can cause disruption of the entire processing system.

Prior methods of achieving accurate alignment have generally utilized moving alignment pins which engage the rear of the conveyed articles. The problem with this method is that when flat, lightweight articles such as letterheads blanks are conveyed, the engagement of the pins with the rear of such articles tends to cause buckling and consequent misalignment thereof.

Although the use of conveyor systems having belts traveling at different speeds is not in itself new, these systems are complicated and generally provide upper and lower belt arrangements as shown, for example, in U.S. Pat. No. 1,070,759. The use of upper and lower belts having a speed differential relationship is also known for the purpose of turning articles from one position to another as disclosed more recently in U.S. Pat. No. 3,462,001.

The present conveyor system solves the problem of accurate alignment of lightweight articles in a manner not disclosed in the known prior art.

SUMMARY OF THE INVENTION

This conveyor apparatus provides a means of accurately maintaining the alignment of conveyed flat articles by using conveyor belts and alignment control chains disposed in side-by-side relation and traveling at different rates of speed.

The apparatus includes a support means having a longitudinal axis and opposed sides and drive means providing a first transverse shaft carried by the support means and having sprockets and pulleys coaxially mounted thereon, and a second transverse shaft carried by the support means in spaced parallel relation with the first shaft and including sprockets and pulleys coaxially mounted thereon, said sprockets on said first and second shafts carrying the aligner chain and said pulleys on said first and second shafts carrying said belt, said belt and chain traveling at different linear speeds.

The sprocket on one shaft is a drive sprocket and the pulley on one shaft is a drive pulley, the linear speed differential between the conveyor belt and the aligner chain being achieved at least in part by the difference in pitch circle diameter between said drive sprocket and said drive pulley.

The drive means includes an independent drive member fixedly attached to one of the first and second shafts and an independent driven member having a different pitch circle diameter fixedly attached to the other of said first and second shafts and means interconnecting said members to rotate the first and second shafts at different speeds.

The drive sprockets and drive pulleys are fixed to their associated shaft and the driven sprockets and driven pulleys are freely mounted to their associated shaft. The drive sprockets and drive pulleys are on different shafts.

Each aligner chain includes a plurality of aligner elements disposed in spaced relation lengthwise of the chain and projecting above the upper span of the associated conveyor belt in engageable relation with an article carried by said conveyor belt.

The support means includes a table plate disposed on each side of said conveyor belts. The upper spans of said conveyor belts project above the table plate and the upper spans of said aligner chains are disposed generally below the table plate, the aligner elements being of a length to project upwardly above said conveyor belts for engagement by said conveyed article.

The apparatus includes upper and lower cooperating disc conveyors mounted to the support frame of the first and second shafts and said upper and lower axes, said conveyors being vertically aligned and having a substantially common point of tangency with the table plate disposed lengthwise between said conveyor shaft axes.

The apparatus includes a pair of adjustable elongate slotted guides disposed outwardly of said aligner chains, said guides receiving the conveyed articles in guided relation.

DESCRIPTION OF THE PREFERRED EMBODIMENT

Figure 1:
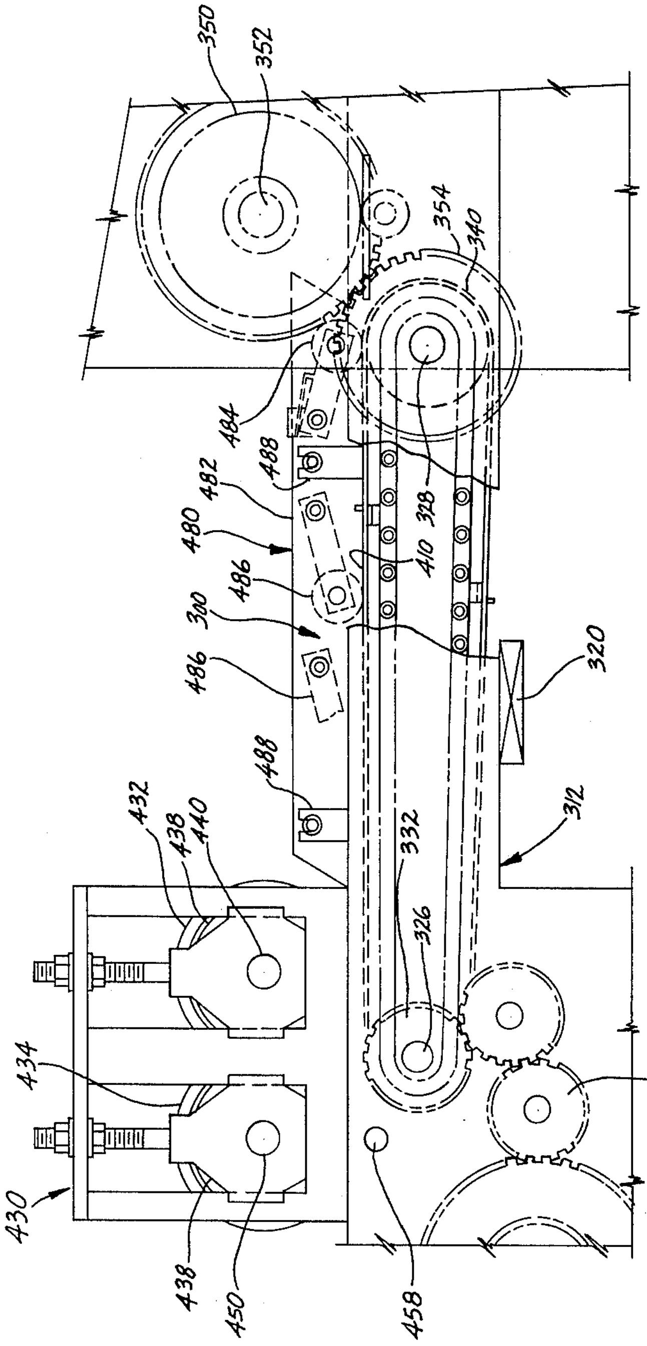
FIG. 1 is a fragmentary elevational view of the aligner apparatus.
Figure 3:
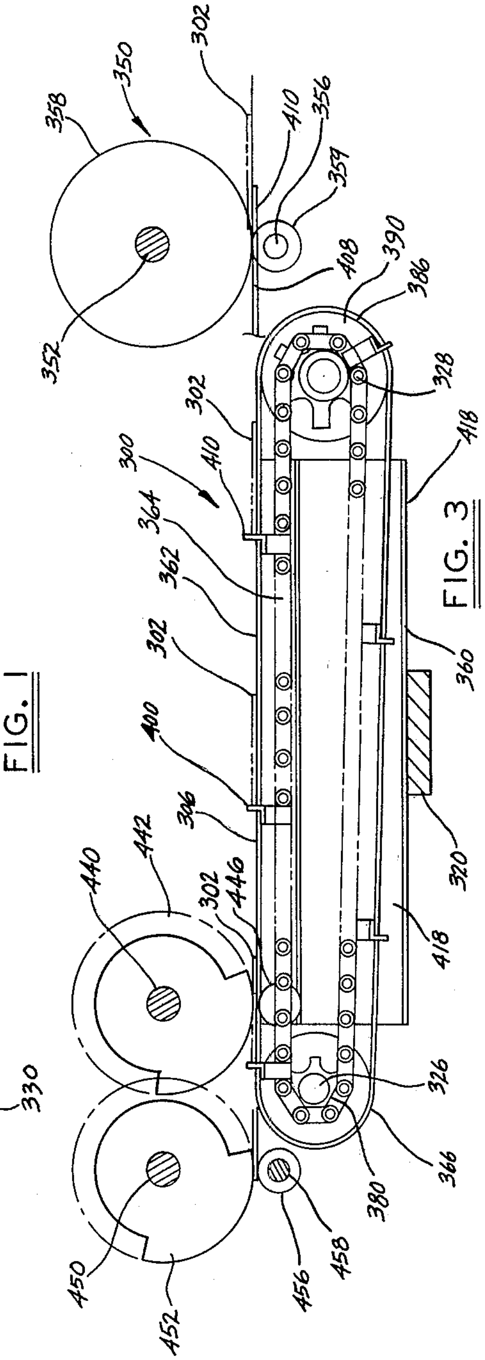
FIG. 3 is a fragmentary sectional elevational view taken on line 3—3 of FIG. 2.
Figure 2:
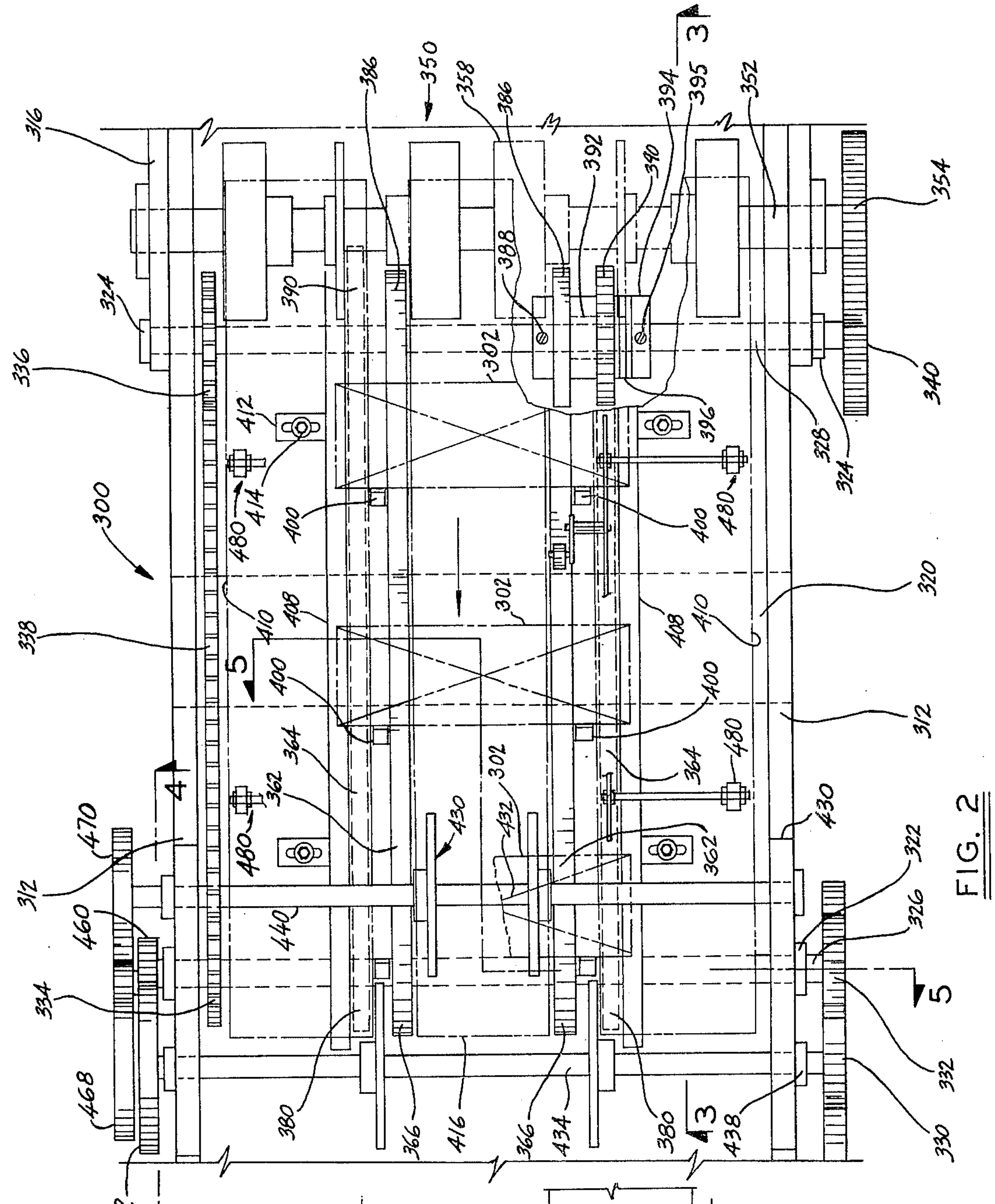
FIG. 2 is a plan view of the apparatus.

Referring now by reference numerals to the drawings and first to FIGS. 1, 2 and 3, it will be understood that the conveyor apparatus generally indicated by numeral 300 can be used for transporting flat, relatively lightweight articles such as letterhead blanks, envelopes, cards, and the like, from a supply source to a processing station. The apparatus can be used in conjunction with a continuous web business form processing machine, such as a continuous envelope assembly machine, for supplying inserts for said envelopes. It is most important in such processing that the insert, indicated by numeral 302, which is fed onto the conveyor apparatus 300, be accurately aligned and spaced during travel thereon and said conveyor apparatus includes means for insuring such accuracy as will now be described.

The conveyor apparatus 300 is carried by a support means provided by side framing members 312 such as provided by the longitudinally extending frame of a continuous envelope processing machine. The framing members 312 are interconnected by a transverse plate 320 and are provided, as shown in FIG. 2, with journal mountings 322 and 324 respectively which support front and rear shafts 326 and 328. At its near side the front shaft 326 is provided with a drive gear 332 at one end which is operatively connected to a drive system shown generally by numeral 330. As also shown in FIG. 2, the front shaft 326, which is the drive shaft, includes a sprocket 334 constituting a drive member. The front shaft 326 is connected to rear shaft 328, which includes a driven sprocket 336 constituting a driven member, by means of a chain 338 operatively connecting said members in drive relation. The rear shaft 328 includes a fixed end gear 340 which is disposed in drive relation with a gear 354 at the end of a drive shaft 352 which controls other portions of the machine such as the feed system indicated generally by numeral 350 by which inserts 302 are supplied to the aligning portion of the apparatus. In the embodiment shown, see FIG. 3, the feed system 350 includes upper and lower discs 356 and 358 mounted respectively on upper shaft 352 and lower shaft 354.

Figure 5:
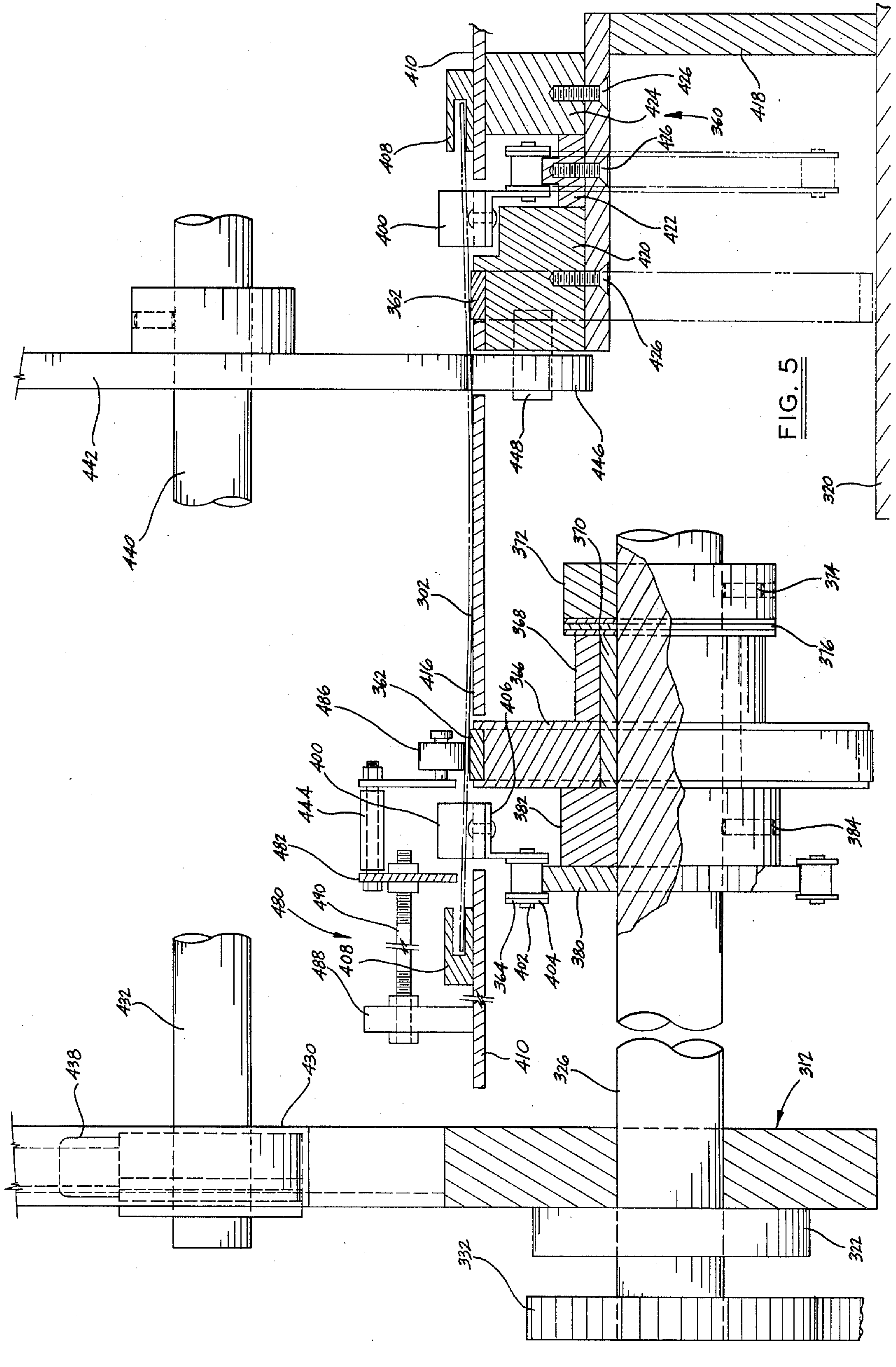
FIG. 5 is an enlarged cross sectional view taken on line 5—5 of FIG. 2.

The aligning portion of the conveyor apparatus indicated by numeral 306 is carried between the front and rear shafts 326 and 328 and is supported intermediate said shafts by a support sub-structure 360 carried by the transverse plate 320 extending between longitudinal support plates 312 and shown in FIGS. 3 and 5.

The structural arrangement of parts of the aligning conveyor portion 306 of the apparatus 300, is best understood by reference to FIGS. 2, 3 and 5, and includes a pair of belts 362 providing an endless flexible conveyor means and a pair of chains 364 constituting an endless flexible alignment means. At the front end as shown in FIGS. 3 and 5, the belts 362 are disposed about idler pulleys 366 each of which includes a boss 368 and a bushing 370 by means of which the front pulley is free to rotate on the front shaft 326. A collar 372 is fixedly attached to the shaft 326 as by a set screw 374 and spacers 376 are provided for accurate alignment of parts. At the front end, the chains 364 are disposed about drive sprockets 380, each of which includes a boss 382 by which the sprocket is fixedly attached to the shaft 326 as by set screw 384 for rotation with said front shaft.

At the rear end, as shown in FIGS. 2 and 3, the belts 362 are disposed about drive pulleys 386 which are larger than the front pulleys 366 and are fixedly attached to the rear shaft 328, as by a set screw 388 for rotation with said shaft. At the rear end, the chains 364 are disposed about idler sprockets 390 which are larger than the front sprockets 380 and include a bushing 392 by means of which the rear sprocket 390 is free to rotate on the rear shaft 328. A collar 394 is fixedly attached to the shaft 328 as by set screw 395 and spacers 396 insure accurate alignment of the sprocket 390 on the rear shaft 328.

Importantly, as best shown in FIG. 5, each chain 364 includes a plurality of outwardly extending guide elements in the form of pins 400 each of which is attached to a chain link by means of side elements 404 and 406 and a pair of substitute link pins 402. The pins are perpendicularly aligned relative to the longitudinal axis of the conveyor and are disposed about each chain 364 at equally spaced intervals for engagement by inserts 302 which are deposited onto the conveyor 300 from a supply source (not shown) by way of feed system 350.

As shown in FIGS. 2 and 5, the inserts 302 are guided widthwise of the conveyor 300 by means of U-shaped longitudinal guides 408 which are adjustably carried by side table plates generally indicated by numeral 410. The adjustment is provided by means of slotted side plates 412 fixedly attached to said guides 408, and connected to said side table plates as by clamping screws 414. A center table plate 416 supports the inserts 302 at their mid-portion.

As shown in FIGS. 3 and 5, the support sub-structure 360 provides intermediate support for the conveyor belts 362 and the aligner chains 364. This support sub-structure consists essentially of lengthwise extending L-shaped members 418 fixedly attached to the transverse member 320 as by fasteners, (not shown) and support blocks 420, 422 and 424 attached to said member 418 as by fasteners 426. Said side table plates 410 and center table plate 416 are likewise attached to said blocks by similar fasteners (not shown).

Figure 4:
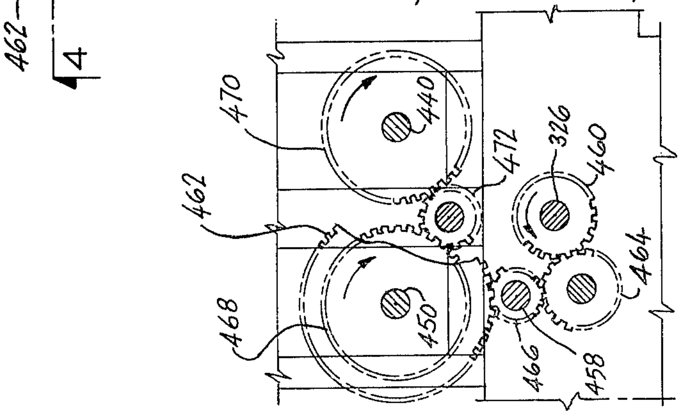
FIG. 4 is a fragmentary sectional elevational view taken on line 4—4 of FIG. 2.

The inserts 302 deposited onto conveyor 306 by the feed system 350 and carried by the cooperating belts and chains 362 and 364 respectively toward the front shaft 326 are removed from the conveyor apparatus aligning portion 306 by a conveyor disc assembly generally indicated by numeral 430 and consisting of substantially similar sets of segment discs 432 and 434, journal mounted between bearings 438 carried by the frame members 312. The disc set 432 is disposed rearwardly of the front conveyor shaft 326 and, as shown in FIG. 5, consists of an upper shaft 440 having a pair of discs 442 fixedly attached thereto and cooperating discs in the form of rotating bearings 446 which are mounted for rotation on lower stub shafts 448 fixedly attached to support block 420. This disc set engages both sides of the insert 302 substantially at the point of tangency of said cooperating elements 442 and 446 and substantially at the elevation of the table plates 416 to move the insert forwardly, and provides means of removing said insert from the conveyor belts. As shown in FIG. 3, the disc set 434 is similar to disc set 432 and consists of an upper shaft 450 carrying a pair of discs 452 and lower cooperating roller 456 mounted for rotation on a transverse shaft 458. As shown in FIG. 4, upper shafts 440 and 450, carrying disc sets 432 and 434, respectively, are driven from the front shaft 326 by means of an end gear 460 fixedly attached to said front shaft. Shaft 450 includes end gears 462 and 468, fixedly attached thereto. End gear 462 is connected to said end gear 460 as by idler gears 464 and 466. End gear 468 is connected to an identical gear 470, fixedly attached to upper shaft 440, by means of idler gear 472.

In order to ensure that the inserts 302 are properly carried by the conveyor belts 362, a hold-down system, generally indicated by numeral 480, is provided to apply light downward pressure to said inserts. As shown in FIGS. 1, 2 and 5, this system consists essentially of a pair of bar members 482 having a plurality of roller arm elements 484 and 486 pivotally attached thereto as shown in FIGS. 1 and 2. As shown in FIGS. 1 and 5, the bar members 482 are held above the table plates 410 by means of spaced post members 488 having rods 490 adjustably attached thereto, nuts 492 being provided at each end of said rods. The roller arm elements are attached to said bar members by means of a shoulder bolt and sleeve assembly 494 so that said roller arm elements are vertically aligned above the belts 362. The initial roller arm elements 484 are, in the embodiment shown, provided with a light spring pressure whereas element 486 acts under gravity only.

The above described structural arrangement of parts of the conveyor apparatus 300 provides a means by which the linear speed of the conveyor belts 362 and aligner chains 364 can be accurately controlled so that a speed differential exists between said belts and chains. In the embodiment shown, the linear speed of the conveyor belts is slightly greater than the linear speed of the aligner pins 400. Because of this, the inserts 302 are conveyed by belts 362 which project slightly above the table top 416 but the alignment is accurately controlled by the aligner pins 400, which project above the conveyor belts. Because the speed differential is small, the forward edge of the insert 302 is urged gently against the aligner pins 400. The chains 364 are not susceptible to slip but the inserts 302 can slip slightly on the belts which are of smooth plastic or similar material.

The speed differential between the front and rear shafts 326 and 328 is controlled by the relative size of the pitch circle diameters of drive and driven sprockets 334 and 336 mounted to said shafts. Because of the pitch circle diameter size differential between the aligner chain drive sprockets 380 and the conveyor drive pulleys 386, there is a circumferential speed differential between these elements, which would exist even if the angular speed of the elements was the same. Thus, the structural arrangement of parts described provides two means of controlling the speed differential of the conveyor belt and the aligner chain, which permits the differential to be controlled with a high degree of accuracy and sensitivity. For example, if the gear ratio between the front and rear sprockets 334 and 336 is 15:20, the angular speed of the rear shaft 328 is 75% of that of the front shaft 326. However, if the pitch circle diameter of the conveyor belt drive pulleys 386 and the aligner chain drive sprocket 380 is 3:2, the belt speed is not 150% of the chain speed but is modified by the relative speed of the shafts and is only $112\frac{1}{2}$% of the speed of the chain.

In the preferred embodiment, the linear speed of the belts 362 is 16.9 inches per second and that of the chain 364 is 15.1 inches per second. Thus, there is a slight slippage between the insert and the upper span of the belts carrying the inserts longitudinally, which continuously urges said inserts with a light pressure against the aligner pins 400, and the perpendicular disposition of the inserts is accurately controlled.

The speed of the front shaft 326 controls not only the speed of the aligner chains 364, but also the speed of the feed means by feed system 350 and the take-off means provided by the conveyor disc assembly 430. The feed system 350 is connected to said front shaft by virtue of the chain drive between the front and rear shafts 326 and 328 and the gear connection provided by end gears 340 and 354, said components being selected so that the circumferential speed of discs 356 is substantially the same as the aligner chain 364. The components of the gear train rotating the take-off segment discs 442 and 452 are likewise selected so that the circumferential speed of said discs is substantially the same as said aligner chain.

I claim as my invention:

1. A conveyor apparatus with alignment means for articles carried thereon, the conveyor apparatus comprising:

(a) support means having a longitudinal axis and opposed sides, (b) an endless flexible conveyor means having interconnected upper and lower spans, said upper span carrying the articles thereon, (c) an endless flexible alignment means disposed in side-by-side relation with said conveyor means and having interconnected upper and lower spans, said alignment means including a plurality of aligner elements disposed in spaced relation lengthwise of said alignment means and projecting above the upper span of the conveyor means for engagement with the articles carried by said conveyor means, (d) drive means for driving said conveyor means at a linear speed of greater than that of the alignment means whereby the articles carried by the conveyor means tend to be urged into engaging relation with the aligner elements, (e) said drive means including means mounting the conveyor means and the alignment means to the support means, for travel of the upper spans thereof in a direction generally parallel with longitudinal axis of the support means, and (f) the flexible conveyor means being a belt, (g) the flexible alignment means being a chain having aligner elements attached to the links thereof, and (h) the drive means including:

1. a first shaft carried by the support means and having an axis of rotation disposed transversely of the longitudinal axis of the support means, said shafts including a sprocket and pulley coaxially mounted thereon,
2. a second shaft carried by the support means, in spaced parallel relation to the first shaft and including a sprocket and pulley coaxially mounted thereon,
3. said sprockets on said first and second shafts carrying said chain and said pulleys on said first and second shafts carrying said belt, one of said sprockets being a drive sprocket the other of said sprockets being an idler sprocket free to rotate on its shaft and one of said pulleys being a drive pulley the other of said pulleys being an idler pulley free to rotate on its shaft, one of said shafts carrying said drive sprocket and said idler pulley and the other of said shafts carrying said idler sprocket and said drive pulley,
4. an independent drive member being fixedly attached to one of said shafts and an independent drive member having a different pitch circle diameter being fixedly attached to the other of said shafts and means operatively connecting said member rotating the first and second shafts at different speeds, and
5. said linear speed differential between said conveyor belt and said aligner chain being achieved at least in part by the difference between the pitch circle diameter of said independent drive and driven members.

2. A conveyor apparatus with alignment means for articles carried thereon, the conveyor apparatus comprising:

(a) support means having a longitudinal axis and opposed sides, (b) an endless flexible conveyor means having interconnected upper and lower spans, said upper span carrying the articles thereon, (c) an endless flexible alignment means disposed in side-by-side relation with said conveyor means and having interconnected upper and lower spans, said alignment means including a plurality of aligner elements disposed in spaced relation lengthwise of said alignment means and projecting above the upper span of the conveyor means for engagement with the articles carried by said conveyor means, (d) drive means for driving said conveyor means at a linear speed of greater than that of the alignment means whereby the articles carried by the conveyor means tend to be urged into engaging relation with the aligner elements, (e) said drive means including means mounting the conveyor means and the alignment means to the support means, for travel of the upper spans thereof in a direction generally parallel with longitudinal axis of the support means, and (f) the flexible conveyor means being a belt, (g) the flexible alignment means being a chain having aligner elements attached to the links thereof, and (h) the drive means including:

1. a first shaft carried by the support means and having an axis of rotation disposed transversely of the longitudinal axis of the support means, said shaft including a sprocket and pulley coaxially mounted thereon,
2. a second shaft carried by the support means, in spaced parallel relation to the first shaft, and including a sprocket and pulley coaxially mounted thereon,
3. said sprockets on said first and second shafts carrying said chain and said pulleys on said first and second shafts carrying said belt, one of said sprockets being a drive sprocket and one of said pulleys being a drive pulley, said drive sprocket and said drive pulley having different pitch circle diameters, and
4. said linear speed differential between said conveyor belt and said aligner chain being achieved at least in part by the difference in pitch circle diameter of said drive sprocket and said drive pulley, (i) said aligner chain sprocket on one shaft being fixedly mounted thereto for rotation with said shaft and said aligner chain sprocket on the other shaft being mounted to said shaft for rotation independently of said shaft, and (j) said conveyor belt pulley on said one shaft being mounted for rotation independently of said shaft and said conveyor belt pulley on said other shaft being fixedly mounted thereto for rotation with said shaft.

3. An apparatus as defined in claim 1, in which:

(k) said drive sprocket on said one shaft has a pitch circle diameter smaller than said drive pulley on said other shaft.

4. A conveyor apparatus with alignment means for articles carried thereon, the conveyor apparatus comprising:

(a) support means having a longitudinal axis and opposed sides, (b) an endless flexible conveyor means having interconnected upper and lower spans, said upper span carrying the articles thereon, (c) an endless flexible alignment means disposed in side-by-side relation with said conveyor means and having interconnected upper and lower spans, said alignment means including a plurality of aligner elements disposed in spaced relation lengthwise of said alignment means and projecting above the upper span of the conveyor means for engagement with the articles carried by said conveyor means, (d) drive means for driving said conveyor means at a linear speed of greater than that of the alignment means whereby the articles carried by the conveyor means tend to be urged into engaging relation with the aligner elements, (e) said drive means including means mounting the conveyor means and the alignment means to the support means, for travel of the upper spans thereof in a direction generally parallel with longitudinal axis of the support means, and (f) the conveyor means being a pair of belts disposed in side-by-side relation, (g) the alignment means being a pair of chains disposed in side-by-side relation, each having aligner elements attached thereto at transversely aligned points, and (h) the belt conveyors being disposed inwardly of said aligner chains, and (i) the drive means including:

1. a first shaft carried by the support means and having an axis of rotation disposed transversely of the longitudinal axis of the support means, said shaft including a pair of sprockets and a pair of pulleys coaxially mounted thereon,
2. a second shaft carried by the support means, in spaced parallel relation to the first shaft, and including a pair of sprockets and a pair of pulleys coaxially mounted thereon,
3. said sprockets on said first and second shafts each carrying a chain and said pulleys on said first and second shafts each carrying a belt, and
4. said sprockets on one of said shafts being drive sprockets and said pulleys on the other of said shafts being drive pulleys and said sprockets on said other shaft being idler sprockets and said pulleys on said one shaft being idler pulleys, (j) the support means including a table plate disposed between said conveyor belts, and (k) the upper spans of said conveyor belts project above said table plate, the upper spans of said aligner chains are disposed generally below the table plate but the aligner elements being of a length to project upwardly above said conveyor belt upper spans.

5. An apparatus as defined in claim 4, in which:

(l) disc conveyor means is mounted to the support means including upper and lower shafts having axes of rotation disposed transversely of the longitudinal axis of the support means and between the axes of rotation of the first and second shafts, and (m) said disc conveyor means including cooperating elements mounted to said upper shaft and said lower shaft in substantially vertical alignment and having substantially common points of tangency with the table plate.

6. An apparatus as defined in claim 4, in which:

(l) a pair of elongate guides are disposed outwardly of said aligner chains each guide including an elongate slot disposed above the table plate receiving the conveyed articles in guided relation, and (m) said guides are adjustable transversely of the longitudinal axis of the support means.

7. An apparatus as defined in claim 4 in which:

(k) hold-down means is mounted to the support means above the conveyor belts to apply downward pressure to articles carried by the conveyor belts.

* * * * *